Nov. 11, 1947.    W. SCHADE    2,430,587
MODIFIED PETZVAL TYPE PROJECTION LENSES
Filed Feb. 9, 1946
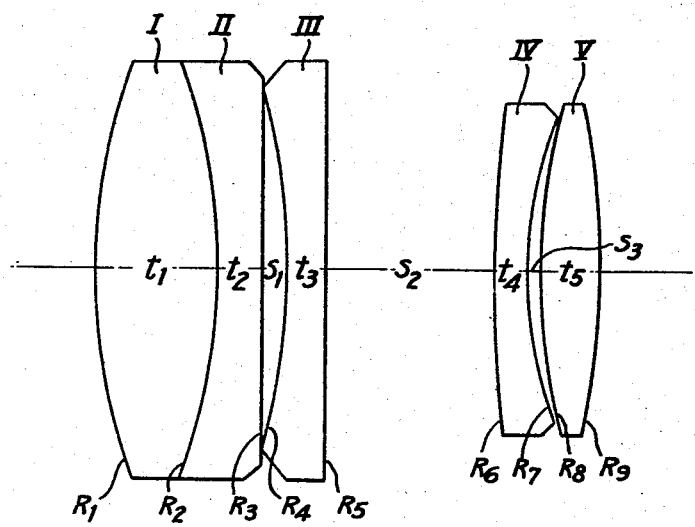
| EF = 100 mm. | | | | f/2.0 |
|---|---|---|---|---|
| LENS | $N_D$ | V | RADII | THICKNESSES |
| I | 1.697 | 56.1 | $R_1$ = + 74.2 mm. | $t_1$ = 16.0 mm. |
| II | 1.649 | 33.8 | $R_2$ = − 70.0 | $t_2$ = 4.9 |
|  |  |  | $R_3$ = ∞ | $S_1$ = 2.9 |
| III | 1.517 | 64.5 | $R_4$ = − 88.05 | $t_3$ = 5.0 |
|  |  |  | $R_5$ = ∞ | $S_2$ = 21.42 |
| IV | 1.649 | 33.8 | $R_6$ = + 203.4 | $t_4$ = 4.0 |
|  |  |  | $R_7$ = + 52.3 | $S_3$ = 1.3 |
| V | 1.697 | 56.1 | $R_8$ = + 75.6 | $t_5$ = 7.5 |
|  |  |  | $R_9$ = − 97.4 | BF = 69.0 |
WILLY SCHADE
INVENTOR
BY
ATTY & AG'T Patented Nov. 11, 1947

2,430,587

UNITED STATES PATENT OFFICE 2,430,587

MODIFIED PETZVAL TYPE PROJECTION LENSES

Willy Schade, Rochester, N. Y., assignor to Eastman Kodak Company, Rochester, N. Y., a corporation of New Jersey Application February 9, 1946, Serial No. 646,684

3 Claims. (Cl. 88—57)

This invention relates to photographic objectives of a modified Petzval type.

By Petzval type objectives is meant objectives consisting of two positive members spaced rather widely apart—heretofore it has been usual to space them more than one-fifth of the focal length apart and sometimes the spacing amounts to as much as the focal length and perhaps somewhat more.

The particular form of Petzval type objective to which the present invention relates is shown in my U. S. Patent 2,158,201, issued May 16, 1939. In it the front member consists of a positive cemented achromatic doublet with its positive element in front followed closely by a simple negative element. The latter is shown as being meniscus in shape but is not necessarily so. Its front surface should be stronger than its rear surface, and it should enclose with the front component an airspace of negative power. The rear member, as shown therein, appears to resemble the earlier art. It is a spaced achromatic doublet, consisting of a negative element of high dispersion (low dispersive index) and a stronger positive element of lower dispersion glass, the particular arrangement shown being that in which the negative element is in front.

It is an object of the present invention to provide a modified Petzval lens system more highly corrected than hitherto available.

It is a further object of a preferred form of the invention to provide a highly corrected high-aperture Petzval type lens which is shorter in overall length and correspondingly more convenient to mount than any available hitherto.

According to the invention, the cemented surface of the front doublet is comparatively weak. Its radius of curvature is preferably between 0.45 F and 0.80 F. Moreover, the front positive element is roughly equi-convex, the radius of curvature of the front surface being between 0.9 and 1.2 times that of the cemented surface. The rear surface of the front positive component has a very weak curvature as in the prior art. It is conveniently between $-0.2/F$ to $+0.5/F$.

According to another feature of the invention, the positive element of the rear member has a focal length between 0.53 F and 0.65 F and is made of glass whose refractive index is between 1.66 and 1.90. For achromatizing with known types of glass, the value which the dispersive index V should have varies somewhat with the refractive index N. If the refractive index is 1.7, the dispersive index should be greater than 45, and if N is 1.9, then V should be greater than 25. This relationship is concisely expressed by the inequality $$V + 100\,N > 215$$

In a preferred embodiment of the invention, the high index low dispersion glass, as specified above, is used in both positive elements of the objective.

According to another feature of the invention, the negative element of the rear member is spaced in front of the positive element by less than 0.03 F. Moreover, this element should have a focal length between 0.8 F and 1.2 F and should be made of a glass whose refractive index is less than that of the adjacent positive element by at least 0.03.

In a preferred embodiment of the invention, the space between the front member and the rear member is between F/5 and F/4. This short space makes for greater convenience in mounting and handling of the lens, and more important optically, it tends to decrease the vignetting of oblique pencils.

By making use of the broad features of the invention, I have decreased the Petzval sum corresponding to a particular spacing of the two members and have achieved a very high degree of correction of the oblique spherical aberration while retaining as high a degree of correction of other aberrations as the Petzval type lens usually has.

By using also the preferred features of the invention, I have produced an objective very highly corrected for zonal and oblique spherical aberration for an aperture of F/2.0 or even larger and having a short back focal length and over-all length, gaining thereby the advantages of convenience already described.

The accompanying drawing shows a preferred embodiment of the invention and structural specifications corresponding thereto. This corresponds to Example 2, below.

The following table, Example 1, gives specifications for an objective broadly according to the invention:

*Example 1*

F = 100 mm.    F/4.0

| Lens | N | V | Radii | Thicknesses |
|---|---|---|---|---|
| I | 1.611 | 57.2 | $R_1 = +53.7$ mm. | $t_1 = 5.6$ mm. |
| II | 1.575 | 42.8 | $R_2 = -50.2$ | $t_2 = 2.3$ |
|  |  |  | $R_3 = +264$ | $s_1 = 0.9$ |
| III | 1.525 | 54.8 | $R_4 = -119.4$ | $t_3 = 2.3$ |
|  |  |  | $R_5 = +552$ | $s_2 = 27.6$ |
| IV | 1.617 | 36.6 | $R_6 = +135.2$ | $t_4 = 2.0$ |
|  |  |  | $R_7 = +375$ | $s_3 = 2.2$ |
| V | 1.697 | 56.1 | $R_8 = +46.7$ | $t_5 = 3.6$ |
|  |  |  | $R_9 = -219$ | $BF = 77.0$ |

This objective is especially intended for uses requiring an extremely fine correction of coma and zonal spherical aberration over a comparatively small field.

In this table and the one that follows, column 1 designates by Roman numerals the lens elements numbered from front to rear; under N and V are given the refractive index for the D line of the spectrum and the dispersive index, respectively.

The radii are designated by R, the thicknesses by $t$ and the spaces by $s$, each numbered by subscripts from front to rear. The back focal length is designated by BF. A negative radius indicates a surface which is concave to the front, that is to the long conjugate for which the objective is corrected.

The following table gives data for an objective according to a preferred form of the invention and corresponds to that shown in the drawing:

Example 2

F=100 mm.    F/2.0

| Lens | N | V | Radii | Thicknesses |
|---|---|---|---|---|
| I | 1.697 | 56.1 | $R_1=+74.2$ mm. | $t_1=16.0$ mm. |
| II | 1.649 | 33.8 | $R_2=-70.0$ | $t_2=4.9$ |
|  |  |  | $R_3=\infty$ | $s_1=2.9$ |
| III | 1.517 | 64.5 | $R_4=-88.0$ | $t_3=5.0$ |
|  |  |  | $R_5=\infty$ | $s_2=21.42$ |
| IV | 1.649 | 33.8 | $R_6=+203$ | $t_4=4.0$ |
|  |  |  | $R_7=+52.3$ | $s_3=1.3$ |
| V | 1.697 | 56.1 | $R_8=+75.6$ | $t_5=7.5$ |
|  |  |  | $R_9=-97.4$ | $BF=69.0$ |

This objective is particularly intended for use as a high aperture projection lens covering a field of ±7° with very sharp definition and may be used to cover even a wider field.

Either of these objectives may, when extremely flat field is desired, be used in combination with a field flattener in known manner.

Both examples embody all the broad features of the invention, as well as the preferred features of prior art cooperating therewith, as set forth in the following list:

| Broad Features | Ex. 1 | Ex. 2 |
|---|---|---|
| $0.45 F<-R_2<0.80 F$ | .54 F | .74 F. |
| $-0.9 R_2<R_1<-1.2 R_2$ | 1.07 $R_2$ | 1.06 $R_2$. |
| $0.53 F<f_V<0.65 F$ | .55 F | .61 F. |
| $1.66<N_V<1.90$ | 1.70 | 1.70. |
| $215<(V_V+100 N_V)$ | 226. | 226. |
| $0.0<s_3<0.03 F$ | .022 F | .013 F. |
| $0.8 F<-f_{IV}<1.2 F$ | .84 F | 1.09 F. |
| $0.03<(N_V-N_{IV})$ | 0.08 | 0.05. |
| Features of Prior Art: |  |  |
| $\|R_4\|<\|R_5\|$ | 0.2 $R_5$ | 0.0 $R_4$. |
| $S_1$ has negative power | Yes | Yes. |
| $-0.2<F/R_3<+0.5$ | +0.38 | 0.00. |

In this table, $f_{IV}$ and $f_V$, respectively, designate the focal lengths of the two elements in the rear member.

Furthermore, as is readily seen from the table of data, the preferred features, listed as follows:

$$0.2F<s_2<0.25F$$
$$1.66<N_1<1.90$$
$$215<(V_1+100N_1)$$

are embodied in the objective shown as Example 2.

What I claim is:

1. An objective consisting of a cemented doublet, a simple negative element enclosing therewith an airspace of negative power, a second simple negative element, and a simple biconvex element, arranged in that order, in which the radii R of the surfaces, the focal lengths $f$ of the elements, the spaces S between the elements, and the refractive indices N of the elements each numbered by subscripts from front to rear, conform to the following algebraic relationships:

$$-0.9R_2<R_1<-1.2R_2$$
$$0.45F<-R_2<0.80F$$
$$0.8F<-f_4<1.2F$$
$$0.53F<f_5<0.65F$$
$$0.2F<S_2<F$$
$$0.0<S_3<0.03F$$
$$(N_4+0.03)<N_5$$
$$1.66<N_5<1.9$$

where F is the focal length of the objective and positive and negative values of radii R indicate surfaces respectively convex or concave to the front; and where the signs < and > respectively mean "is less than" and "is greater than."

2. An objective according to claim 1 in which:

$$-0.2<(F/R_3)<+0.5$$
absolute value of $R_4$ < absolute value of $R_5$
$$0.005\ F<S_1<0.05\ F$$
$$1.6<N_1<1.9$$
$$1.55<N_2<1.85$$
$$1.45<N_3<1.55$$
$$1.57<N_4$$
$$V_1>V_2$$
$$V_4<V_5$$
$$(V_5+100\ N_5)>215$$

where V denotes the dispersive indices of the elements numbered by subscripts from front to rear.

3. An objective according to claim 2 in which $S_2<0.25\ F$, $N_1>1.66$ and $(V_1+100\ N_1)>215$.

WILLY SCHADE.

REFERENCES CITED

The following references are of record in the file of this patent:

UNITED STATES PATENTS

| Number | Name | Date |
|---|---|---|
| 1,899,069 | Warmisham | Feb. 28, 1933 |
| 2,158,201 | Schade | May 16, 1939 |
| 2,158,179 | Frederick et al. | May 16, 1939 |

FOREIGN PATENTS

| Number | Country | Date |
|---|---|---|
| 481,830 | Germany | Aug. 31, 1929 |